US008782718B2

(12) United States Patent
Nagata et al.

(10) Patent No.: US 8,782,718 B2
(45) Date of Patent: Jul. 15, 2014

(54) MOBILE TERMINAL, TELEVISION RECEIVER, AND COMMUNICATION SYSTEM INCLUDING THE MOBILE TERMINAL AND THE TELEVISION RECEIVER

(71) Applicants: Junichi Nagata, Tsurugashima (JP); Sota Mizuno, Fukaya (JP); Tatsuro Saitou, Ome (JP)

(72) Inventors: Junichi Nagata, Tsurugashima (JP); Sota Mizuno, Fukaya (JP); Tatsuro Saitou, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/679,048

(22) Filed: Nov. 16, 2012

(65) Prior Publication Data
US 2013/0176502 A1 Jul. 11, 2013

(30) Foreign Application Priority Data

Jan. 6, 2012 (JP) .................................. 2012-001194

(51) Int. Cl.
| H04N 7/18 | (2006.01) |
| H04N 7/173 | (2011.01) |
| H04N 5/44 | (2011.01) |
| H04N 21/422 | (2011.01) |
| G06F 17/30 | (2006.01) |
| H04N 21/41 | (2011.01) |
| H04N 21/436 | (2011.01) |

(52) U.S. Cl.
CPC ............. *H04N 5/44* (2013.01); *H04N 21/4222* (2013.01); *G06F 17/30861* (2013.01); *H04N 21/4126* (2013.01); *H04N 21/43615* (2013.01)
USPC ................................. 725/85; 725/81; 725/110

(58) Field of Classification Search
USPC ........... 725/37, 74, 80, 81, 85, 105, 109, 110, 725/131, 133
See application file for complete search history.

(56) References Cited

U.S. PATENT DOCUMENTS

| 8,214,459 B2 | 7/2012 | Matsubara et al. |
| 8,533,759 B2 | 9/2013 | Yuki et al. |
| 8,549,109 B2 | 10/2013 | Matsubara et al. |
| 2007/0053514 A1 | 3/2007 | Imai et al. |
| 2009/0081950 A1 | 3/2009 | Matsubara et al. |
| 2010/0186043 A1 | 7/2010 | Yuki et al. |

(Continued)

FOREIGN PATENT DOCUMENTS

| EP | 1796389 | 6/2007 |
| JP | 2003271508 | 9/2003 |

(Continued)

OTHER PUBLICATIONS

European Application No./Patent No. 12187681.7-1908, Extended European Search Report, mailed Apr. 19, 2013, (Reference No. 19911/EL).

(Continued)

*Primary Examiner* — John Schnurr
(74) *Attorney, Agent, or Firm* — Blakely, Sokoloff, Taylor & Zafman LLP

(57) ABSTRACT

According to one embodiment, a communication system includes a transmitter and a switch. The transmitter transmits, to a television receiver, an address used to access a server on a network used by a mobile terminal. The switch automatically switches, after the address is transmitted, the display of the mobile terminal to an operation display that displays an operation element suitable for the operation state of the television receiver.

14 Claims, 9 Drawing Sheets

(56) References Cited

U.S. PATENT DOCUMENTS

2010/0245680 A1* 9/2010 Tsukada et al. .............. 348/734
2012/0246687 A1  9/2012 Matsubara et al.
2013/0152135 A1* 6/2013 Hong et al. .................... 725/51

FOREIGN PATENT DOCUMENTS

| JP | 2004021821 | 1/2004 |
|---|---|---|
| JP | 2005056096 | 3/2005 |
| JP | 2005175862 | 6/2005 |
| JP | 2006222565 | 8/2006 |
| JP | 2007074529 | 3/2007 |
| JP | 2009080593 | 4/2009 |
| JP | 2009130876 | 6/2009 |
| JP | 2010211806 | 9/2010 |
| JP | 2011-077671 | 4/2011 |
| JP | 2011077671 | 4/2011 |
| JP | 2011-199568 | 10/2011 |
| JP | 2011199568 | 10/2011 |
| WO | WO 2009008179 | 1/2009 |

OTHER PUBLICATIONS

Japanese Patent Application No. 2012-001194, First Office Action, mailed Dec. 4, 2012, (with English Translation).
Japanese Patent Application No. 2013-6848 First Office Action, mailed Dec. 17, 2013, (with English Translation).
Japanese Patent Application No. 2012-001119, First Office Action, mailed Oct. 9, 2012, (with English Translation).
European Application No./Patent No. 12170892.9-1908, Extended European Search Report, mailed Apr. 22, 2013, (Reference No. 19710/EL).
"Airplay like functionality for Google TV", google groups, Aug. 9, 2011, XP0550058914, Retrieved from the Internet: URL:https://groups.google.com/group/googletv-android/browse_thread/thread/5d597190f620a628 [retreived on Apr. 9, 2013].
U.S. Appl. No. 13/531,277, Non Final Office Action, mailed May 7, 2013.
U.S. Appl. No. 13/531,277, Non Final Office Action, mailed Nov. 25, 2013.

* cited by examiner

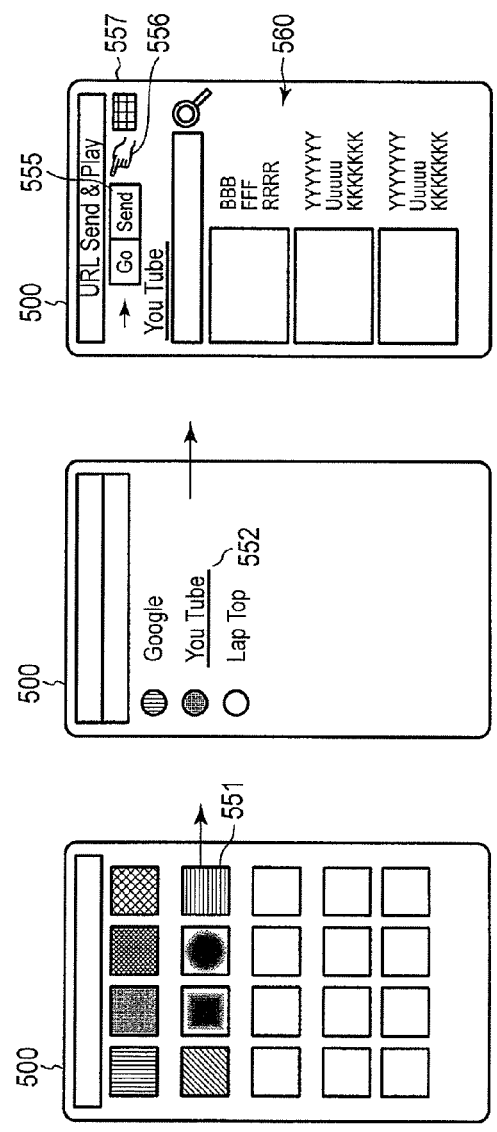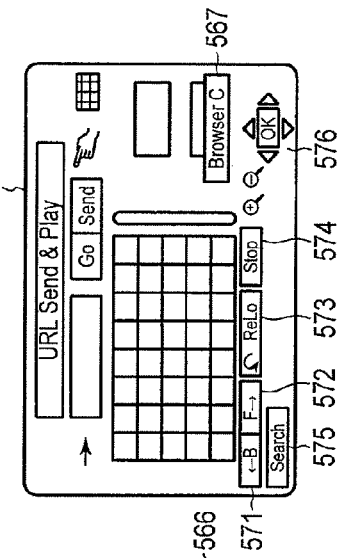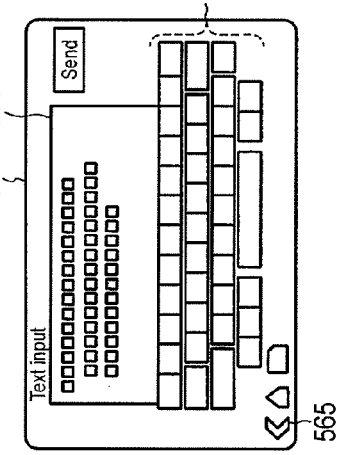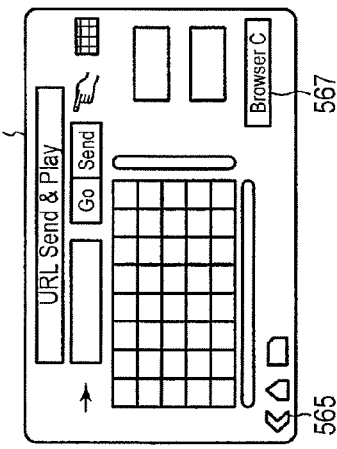

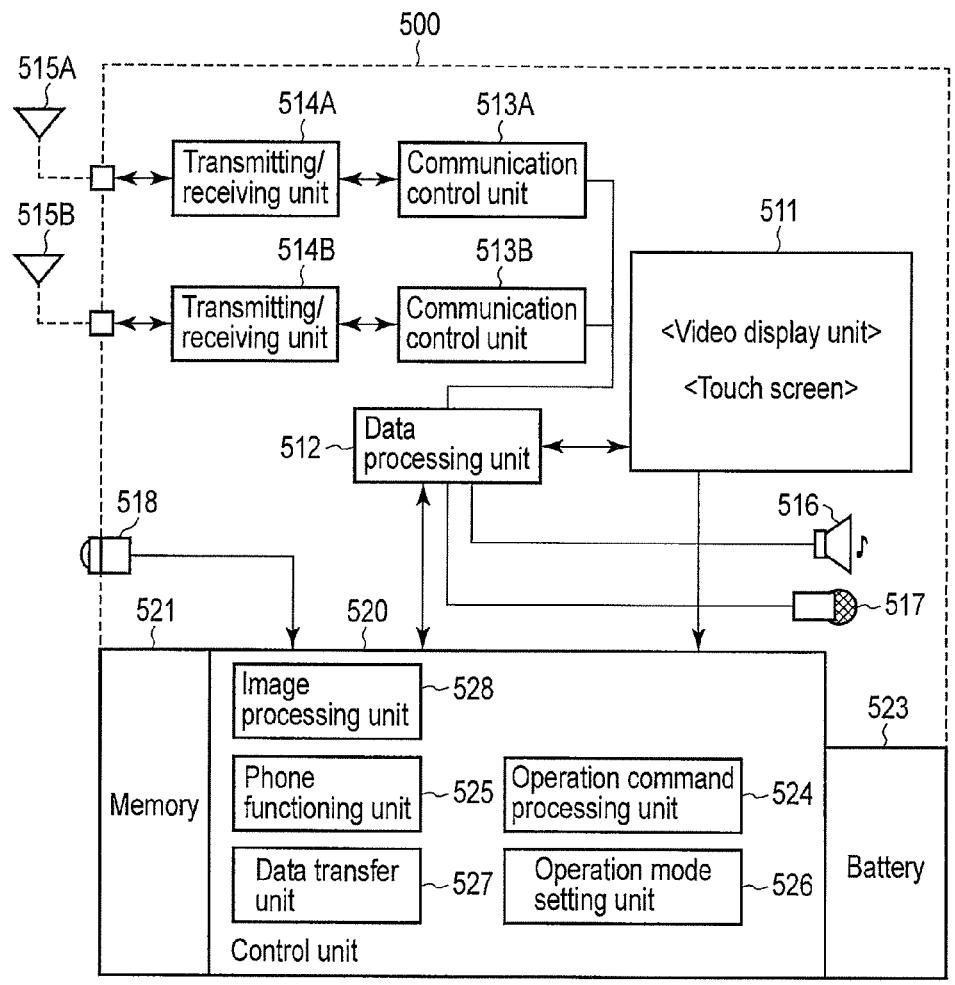
F I G. 8

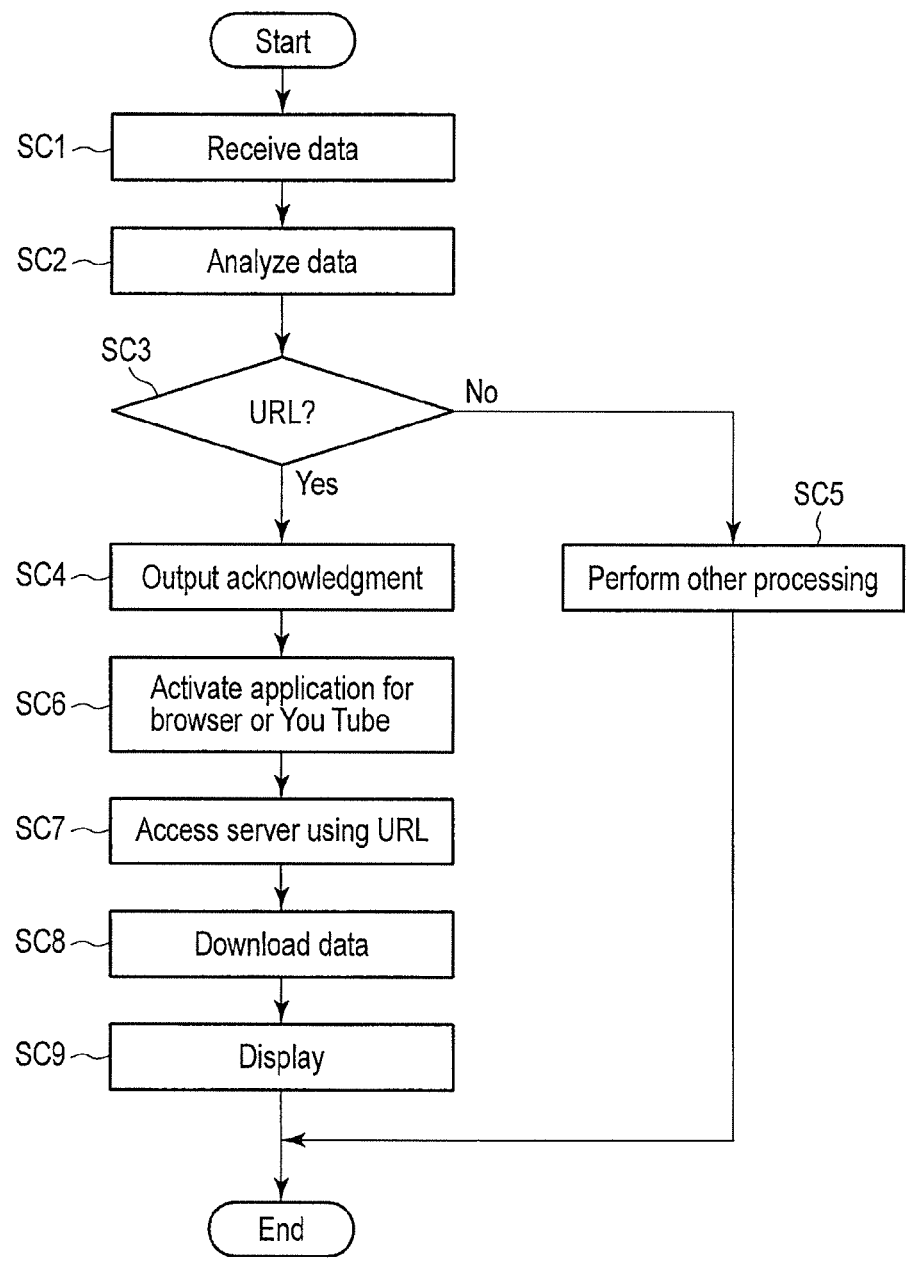
F I G. 11

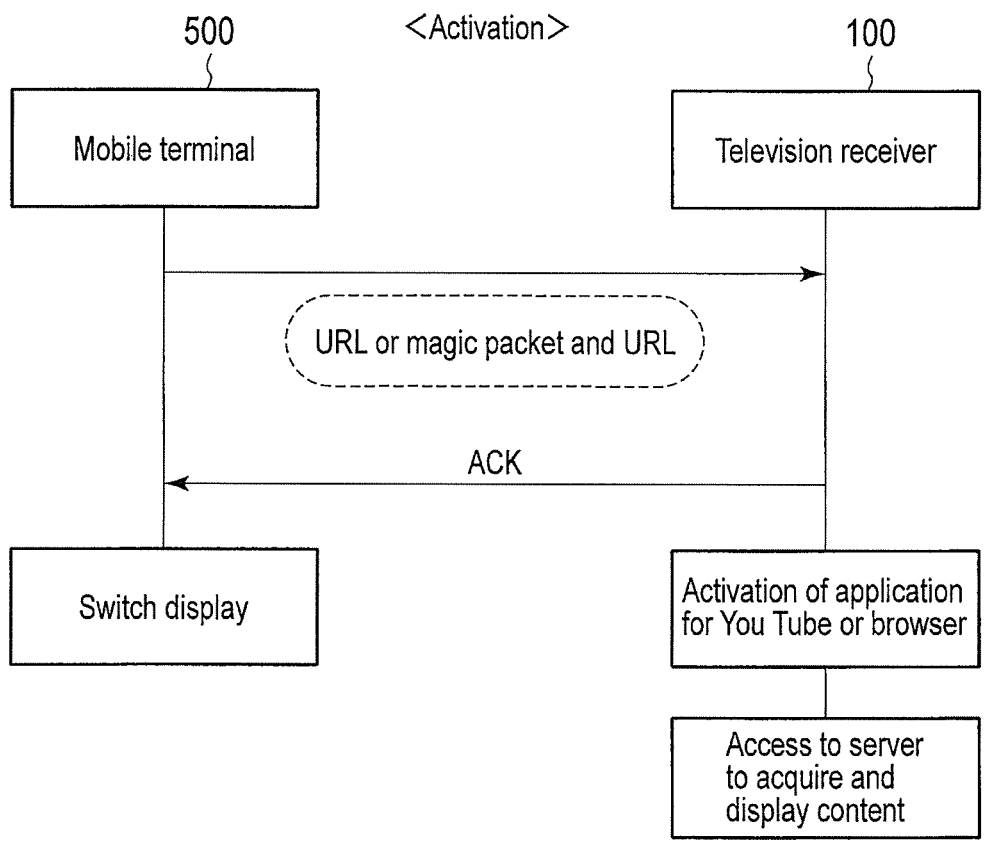
F I G. 12

MOBILE TERMINAL, TELEVISION RECEIVER, AND COMMUNICATION SYSTEM INCLUDING THE MOBILE TERMINAL AND THE TELEVISION RECEIVER

CROSS-REFERENCE TO RELATED APPLICATIONS

This application is based upon and claims the benefit of priority from Japanese Patent Application No. 2012-001194, filed Jan. 6, 2012, the entire contents of which are incorporated herein by reference.

FIELD

Embodiments described herein relate generally to a mobile terminal, a television receiver, and a communication system including the mobile terminal and the television receiver.

BACKGROUND

Various mobile terminals, such as mobile phones, tablets, personal digital assistants (PDAs), wireless modems, lap-top computers, and personal computers, have recently been developed. Techniques for associating a mobile terminal with a television receiver via a communication unit have also been developed.

On the other hand, mobile terminals and television receivers have been technically improved in, for example, their own functionality and performance.

Although these technical improvements have been made, there is a demand for a communication system and apparatus designed to enable the functionality of the mobile terminal and the television receiver to be sufficiently realized without interfering with each other.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3A shows a view illustrating various display image examples displayed by the mobile terminal of FIG. 1;

FIG. 3B shows a view illustrating various display image examples displayed by the mobile terminal of FIG. 1;

FIG. 3C shows a view illustrating various display image examples displayed by the mobile terminal of FIG. 1;

FIG. 3D shows a view illustrating various display image examples displayed by the mobile terminal of FIG. 1;

FIG. 3E shows a view illustrating various display image examples displayed by the mobile terminal of FIG. 1;

FIG. 3F shows a view illustrating various display image examples displayed by the mobile terminal of FIG. 1;

FIG. 8 shows a block diagram illustrating a configuration example of the mobile terminal shown in FIG. 1;

FIG. 11 shows a flowchart illustrating an operation example of the television receiver shown in FIG. 1; and FIG. 12 shows a view useful in explaining an operation example of the television receiver performed for activation if a URL is transmitted from the mobile terminal to the television receiver shown in FIG. 1.

DETAILED DESCRIPTION

Various embodiments will be described hereinafter with reference to the accompanying drawings.

In general, according to one embodiment, there are provided a mobile terminal, a television receiver, and a communication system including the mobile terminal and the television receiver, so that those are adapted to technical improvements.

According to an embodiment of the present disclosure, in the communication system in which a mobile terminal and a television receiver are configured to be interactively communicable with each other, a transmitter is configured to transmit, to the television receiver, an address used to access a server on a network used by the mobile terminal, and a switch is configured to automatically switch, after the address is transmitted, a display of the mobile terminal to an operation display that displays an operation element suitable for an operation state of the television receiver.

The embodiment will be described in more detail with reference to the drawings.

Figure 1:
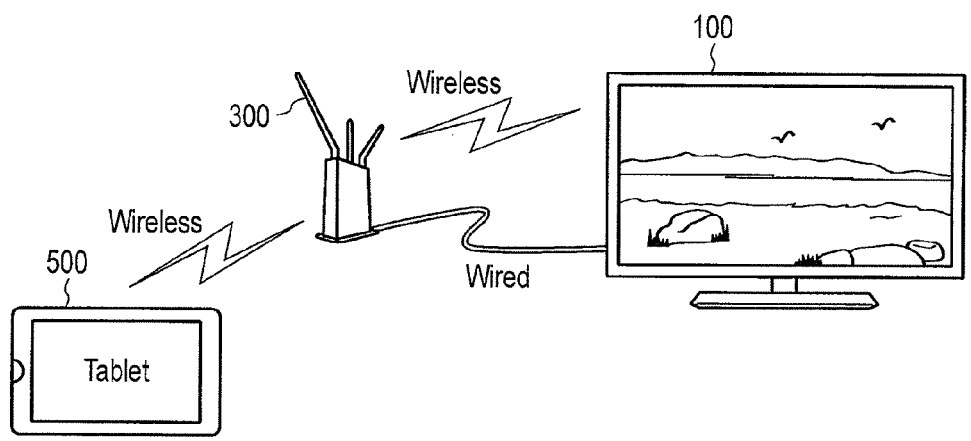
FIG. 1 shows a view illustrating a mobile terminal, an access point and a television receiver, and useful in explaining the fundamental concept of an embodiment.

FIG. 1 is a view illustrating a mobile terminal, an access point and a television receiver, and useful in explaining the fundamental concept of the embodiment. Reference number 500 denotes the mobile terminal that can communicate with the television receiver 100 via the access point 300. The access point 300 may employ various short-distance wireless communication schemes.

The mobile terminal 500 and the access point 300 are connected by radio or wiring, and the access point 300 and the television receiver 100 are connected by radio or wiring. Alternatively, the mobile terminal 500 and the television receiver 100 may be directly connected by radio or wiring.

Figure 2:
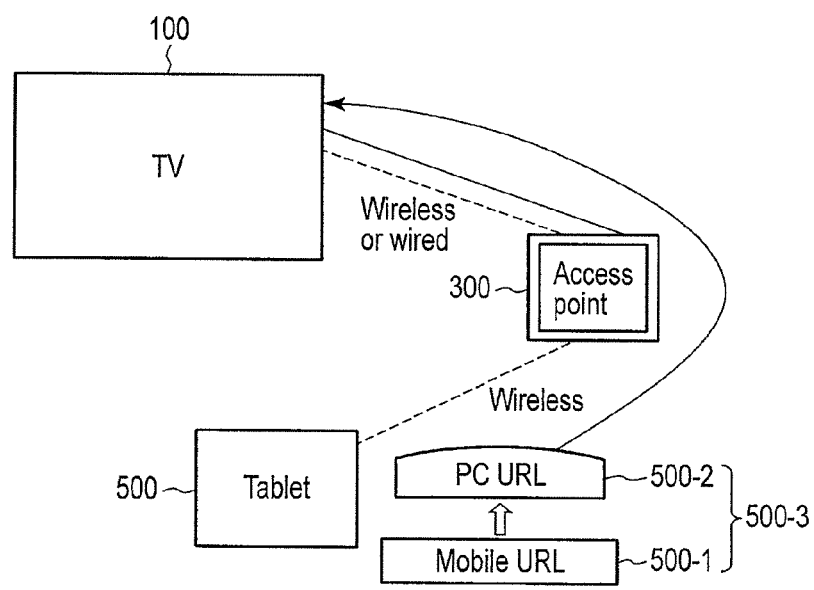
FIG. 2 shows a block diagram illustrating the mobile terminal, the access point and the television receiver shown in FIG. 1.

FIG. 2 is a block diagram illustrating the mobile terminal 500, the access point 300 and the television receiver 100 shown in FIG. 1. The mobile terminal 500 may be also called a tablet. The mobile terminal 500 can convert, for example, a URL for mobile terminals into a URL for personal computers (PCs), and transmit the converted URL to the television receiver 100 via the access point 300. Upon receiving the URL for PCs, the television receiver 100 accesses a server (not shown) using the URL, thereby acquiring content or performing browsing.

Upon receiving the URL (the converted URL) from the mobile terminal 500, the television receiver 100 automatically activates the application corresponding to the URL and then accesses the server.

If the mobile terminal (tablet) 500 converts and transmits a URL to the television receiver 100, it converts the domain name portion of a URL from, for example, as follows:

http://m.youtube.com/watch?v=R4jVMMCLn4E (a URL for mobile terminals) into http://www.youtube.com/watch?v=R4jVMMCLn4E (a URL for PCs).

If "sed" (an example of a conversion rule) is used, processing is performed using a conversion rule that includes a constant for converting the domain portion, for example, as follows:

sed s/'¥/¥/m.youtube.com¥/'/'¥/¥/www.youtube.com¥/'/
input command: $ echo http://m.youtube.com/watch?v=R4jVMMCLn4E|sed s/'¥/¥/m.youtube.com¥/'/'¥/¥/www.youtube.com¥/'/
output: http://www.youtube.com/watch?v=R4jVMMCLn4E The above URL conversion may be performed in the television receiver, and be used by the television receiver. This conversion example is just an example, and the embodiment is not limited to it. For instance, URLs on a plurality of sites may be stored in the form of a table to enable them to be selected from the table. Yet alternatively, the mobile terminal 500 or the television receiver 100 may transmit an address to an external server, and receive therefrom a converted address and use it. Thus, URLs may be provided in any of the mobile terminal, the television receiver, and an external server with which the mobile terminal and/or the television receiver can communicate. As the external server, a business server in a particular company or facilities may be used.

FIG. 2 shows a unit 500-3 for converting mobile URL 500-1 into PC URL 500-2.

FIG. 3A shows a state, in which various icons are displayed on the initial display of the mobile terminal 500. If a touch operation (point operation) is performed on, for example, a "URL transmission" button 551 included in the icons, such a site selection display as shown in FIG. 3B appears. The site selection display shows, for example, "Google (trademark)" and "You Tube (trademark)" as site examples. If a user touches, for example, a "You Tube" touch button 552, a Send button 555 is displayed and a display 560 for the "You Tube" site is display based on the mobile URL, as is shown in FIG. 3C.

At this time, if the user operates the "Send" button 555 to transmit the URL to the television receiver, the television receiver 100 displays the You Tube site display. If the television receiver 100 accesses the You Tube server, it uses a PC URL to acquire a high definition video signal, and displays the signal.

In general, the mobile terminal 500 uses a mobile URL, and hence acquires and displays a video signal of a low quality, low definition or standard definition (SD). In contrast, the television receiver 100 uses a PC URL, and therefore can acquire a video signal of a high resolution, high quality or high definition (HD).

The screen shown in FIG. 3C also displays an operation icon 556 for switching the mobile terminal 500 to a pointer mode, and an operation icon 557 for switching the mobile terminal 500 to a keyboard mode.

FIG. 3D shows a display example assumed if the mobile terminal 500 is switched to the pointer mode. The user can move the pointer position on the screen of the television receiver by touching the pointer and dragging the same over the screen. In FIG. 3D, if an operation button 565 is touched, the display screen of FIG. 3C is returned. FIG. 3E shows a display example assumed if the mobile terminal 500 is switched from the state of FIG. 3C to the keyboard mode. Also in this case, if the operation button 565 is touched, the display screen of FIG. 3C is returned. The screen of FIG. 3E displays a plurality of operation keys 566. By touching keys to input a text, the text is display on a text display area 568.

If a browser control button 567 displayed on the screen of the mobile terminal 500 in the state of FIG. 3D is touched, operation buttons 571 to 576 for browser operation are displayed as shown in FIG. 3F. The operation button 571 is a backward button for returning the browser display to the preceding browser display, the operation button 572 is a forward button for forwarding the browser display to the next display, the operation button 573 is a load button for reloading the browser display, the operation button 574 is a stop button for stopping the browser, and the operation button 576 is a cursor button for cursor movement and determination. On the screen shown in FIG. 3F, the browser control button 567 is also displayed. If the browser control button 567 is operated, the display is returned to that of FIG. 3D.

By virtue of the above structure, if the television receiver 100 displays, for example, a You Tube site and some operation are needed, the user can utilize the mobile terminal 500 as an operation device by switching the display of the terminal as shown in FIG. 3D, 3E or 3F.

The mobile terminal 500 includes a backward key (not shown) provided on its frame. By operating the backward key, the display of the terminal 500 can be instantly returned to the initial display shown in FIG. 3A.

Figure 4:
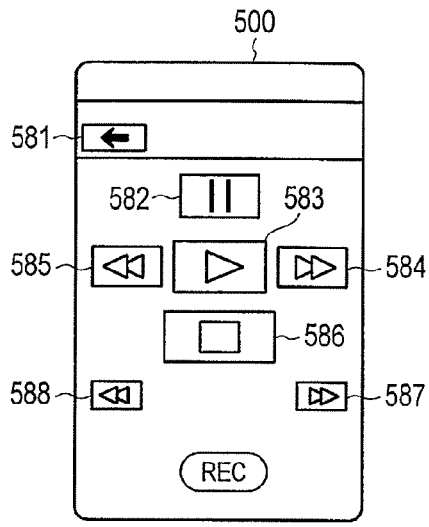
FIG. 4 shows a view illustrating another display image example displayed by the mobile terminal of FIG. 1.

The mobile terminal 500 further includes a transmitter for transmitting an address used to access a server on a network, and a switch for automatically switching, after transmitting the address, the display of the mobile terminal 500 to such an operation display as shown in, for example, FIG. 4, which displays operation keys for operating the television receiver 100.

If the mobile terminal 500 transmits a URL, if it recognizes that the URL is for moving picture supply, the switch automatically switches the display of the mobile terminal 500 to the operation display shown in, for example, FIG. 4, after transmitting the URL.

Upon receiving an acknowledgment from the television receiver 100 after transmitting the URL thereto, the switch of the mobile terminal 500 switches the display of the mobile terminal 500 to the operation display for operating the television receiver 100.

Further, if the television receiver 100 is shifted from a power-on state to a standby state or a power-off state, the switch of the mobile terminal 500 switches back the operation display for the television receiver 100 to the display assumed before the operation display. After transmitting the URL, the switch switches an operation display for address transmission to the operation display for operating the television receiver 100.

On the other hand, upon receiving a URL used to access a server on a network, the television receiver 100 transmits, to the mobile terminal 500, an acknowledgment for allowing automatic switching of the display of the mobile terminal 500 to the operation display that displays operation keys for operating the television receiver 100.

As described above, in the embodiment, the mobile terminal 500 converts a mobile URL into a PC URL, and transmits the resultant PC URL to the television receiver 100. In this case, if the type of operation for operating the television receiver 100 is known beforehand (or if the type of operation is prefixed), the display of the mobile terminal 500 may be automatically switched to display operation keys. For instance, operation keys 581 to 588, such as "return," "pause,"

"replay," "fast forward," "fast backward," "stop," "frame forward," "frame backward," "record," etc., may be displayed simultaneously.

Alternatively, if the URL transmitted from the mobile terminal 500 to the television receiver 100 is addressed to a moving picture site, the mobile terminal 500 may automatically switch to a replay operation display (shown in, for example, FIG. 4) for operating the television receiver, while if the URL is addressed to a website, the mobile terminal 500 may automatically switch to a pointer operation display (shown in for example, FIG. 3D) for operating the television receiver.

Figure 5:
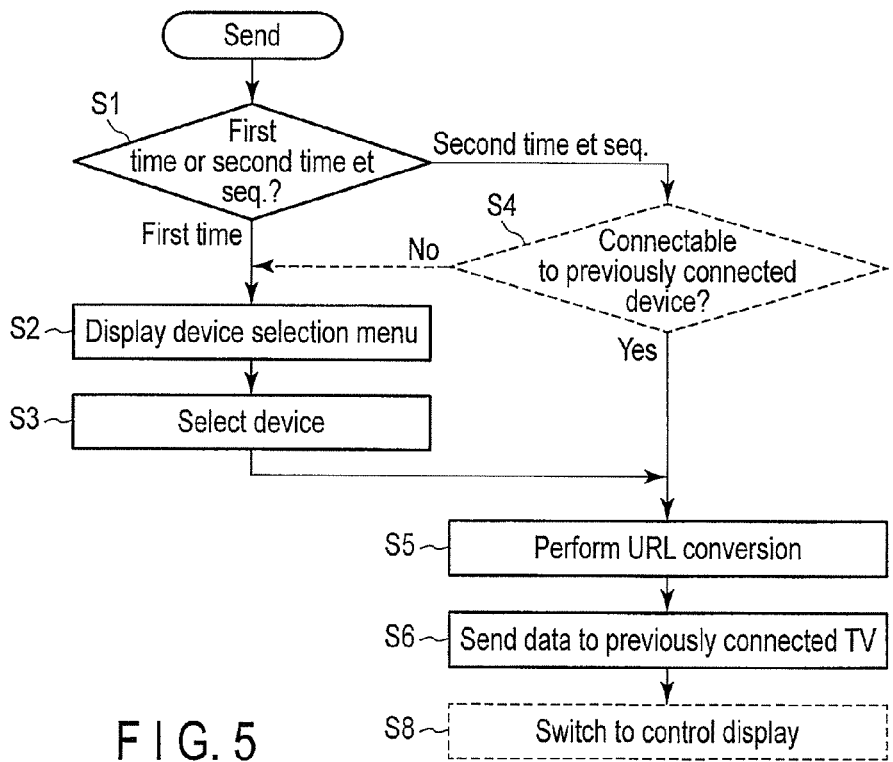
FIG. 5 shows a flowchart useful in explaining an operation example of transmission of a URL from the terminal to the television receiver shown in FIG. 1.

FIG. 5 schematically shows the operation procedure of the mobile terminal 500 assumed if the terminal transmits a URL. Firstly, it is determined whether the URL transmission is the first one (step S1). If it is the first one, a device selection menu is displayed (step S2). In contrast, if the URL transmission is determined to be the second or later one, URL conversion is performed to transmit the converted URL to the television receiver 100 previously connected (steps S5 and S6). After confirming the transmission of the URL, the display of the mobile terminal may be switched to a control display. Confirmation of the URL transmission is realized if an acknowledgment is received from the television receiver 100. The switching to the control display may be automatically performed, or be performed if a user selects a pointer mode or a keyboard mode.

At step S4 before step S5, it may be determined whether the mobile terminal can access the television receiver 100. However, step S4 is not indispensable.

Figure 6:
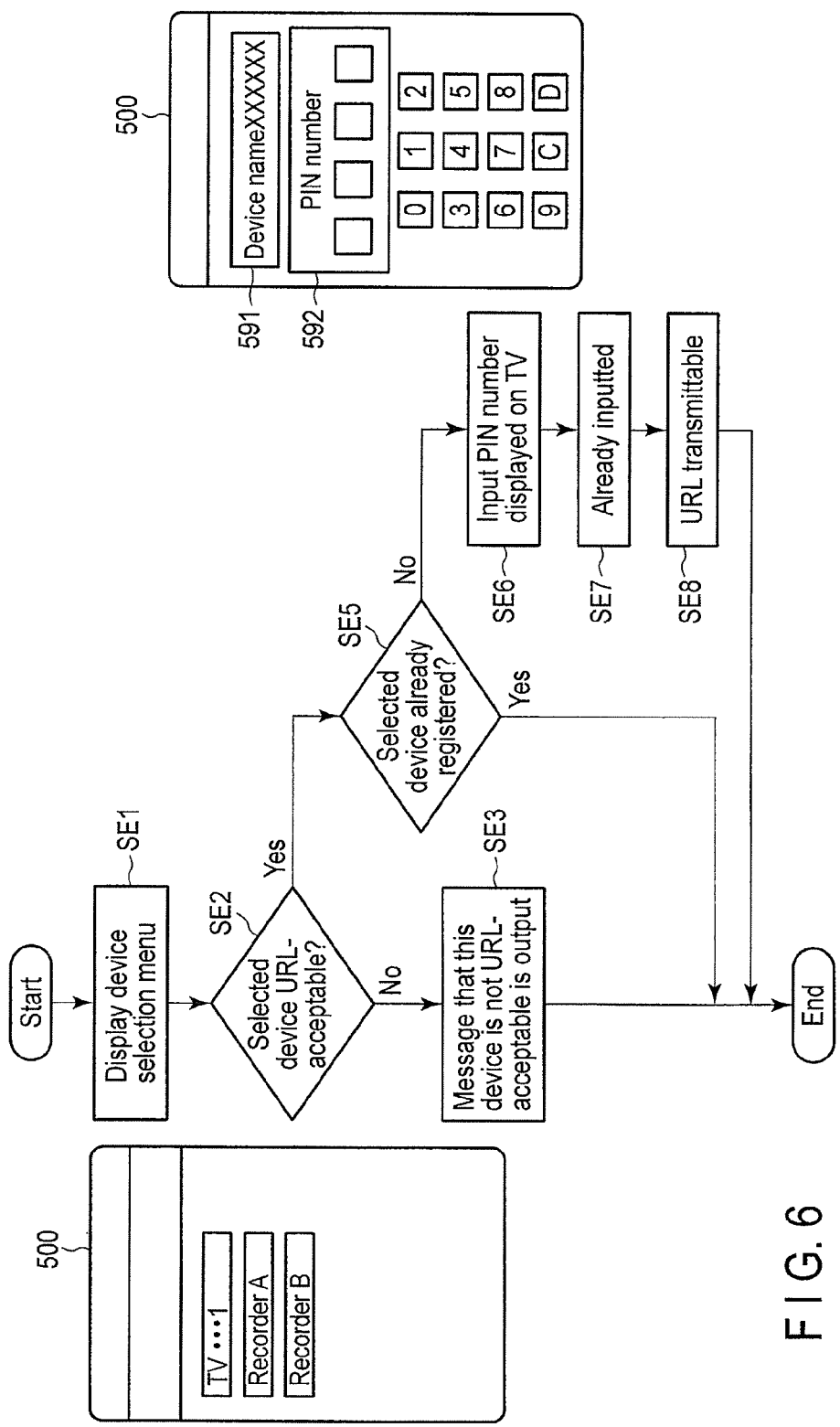
FIG. 6 shows a view useful in explaining a registration procedure performed if a device as a communication destination is registered in the terminal of FIG. 1.

FIG. 6 more specifically shows the procedure performed by the mobile terminal 500 if it selects a device. If the program shifts to a device selection menu step (step SE1 corresponding to step S2 of FIG. 5), the device names registered in the mobile terminal 500 are displayed. In the example shown in FIG. 6, TV1, recorder A and recorder B are displayed as the device names. Subsequently, if a user points (touches) a device name (such as TV1), it is determined whether the selected device has URL-acceptable specifications. This determination is performed by, for example, mobile terminal inquiring the television receiver, and receiving a response therefore. If the determination result indicates that the device is not URL-acceptable, a message "this device is not URL-acceptable" is output (steps SE2 and SE3).

In contrast, if it is determined at SE2 that the selected device (e.g., TV1) is URL-acceptable, it is determination whether the selected device is already registered (step ST5). If it is registered, this program is terminated, i.e., it proceeds to step S5 of FIG. 5. In contrast, if the device is not registered, the mobile terminal 500 displays a device name 591 and a registration display 592, and also displays a message "Please input PIN number displayed on the TV."

This message encourages input of a number of four digits in, for example, the shown example. The user touches the ten-key image displayed on the mobile terminal 500 to input a PIN number. If there is an input mistake, the user operates a clear key "C," whereby the input number is cleared in units of one digit from the lowest digit. If the user wishes to fix the input of the four digits, they operate a determination key "D." As a result, it is determined that the PIN number has been input (step SE7), and a message "URL transmission is possible" is displayed, whereby the program proceeds to step S5 of FIG. 5.

Figure 7:
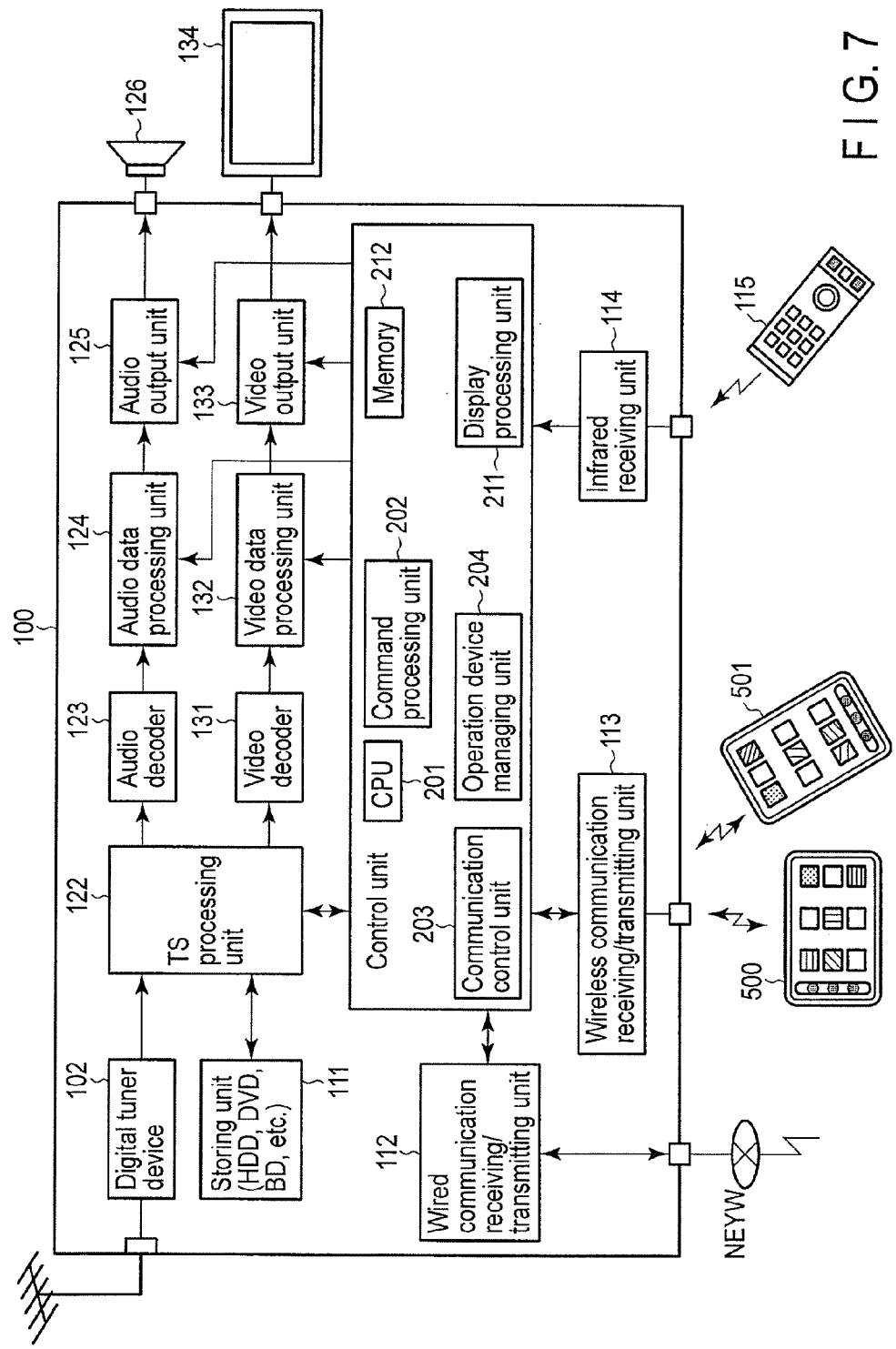
FIG. 7 shows a block diagram illustrating a configuration example of the television receiver shown in FIG. 1.

FIG. 7 is a block diagram illustrating a configuration example of the television receiver of the embodiment, and FIG. 8 is a block diagram illustrating a configuration example of the mobile terminal of the embodiment.

As shown, the television receiver 100 comprises a digital tuner device 102 including a plurality of tuners for receiving, for example, scrambled terrestrial digital broadcasting signals. The digital tuner device 102 may also include, for example, a BS/CS digital broadcasting tuner (not shown).

The signals of the broadcast programs received by the first tuner device 102 are input to a TS re-multiplexing section 141 which functions as re-multiplexing section, where transport streams (TS) of these plurality of channels (CH) are re-multiplexed into a multiplexed TS of a single stream. The multiplexed TS train has a packet train including each channel packet. Each channel packet additionally includes identification information for identifying the corresponding channel and packet. The multiplexed TS train is input to a storing unit 111. Further, those of the packets in the TS, which include control information, are input to and processed by a control unit 200.

The storing unit 111 includes, for example, a hard disk driver and an optical disk recording/reproducing unit. Optical disks include digital versatile disks (DVDs), blue-ray disks (BDs), etc.

The packets sent from a TS processing unit 122 to the control unit 200 contain, for example, an entitlement control message (ECM) as encrypted information of a broadcast program, information such as an event information table (EIT) concerning a program name, performers, start time, etc., an electronic program guide (EPG).

The video data contained in a packet is data having been encoded by, for example, MPEG (moving picture expert group), AVC (advanced video coding), etc. Further, audio data in an audio packet is data having been encoded by, for example, PCM (pulse code modulation), Dolby, MPEG, etc. An AV decoder 126 separates program information into video packets and audio packets, and decodes the data in each packet in accordance with the corresponding processing scheme.

Accordingly, the packets separated by the TS processing unit 122 and including audio data are input to an audio decoder 123, where decoding corresponding to the encoding scheme is performed. The audio data decoded by the audio decoder 123 is sent to an audio data processing unit 124, where it is subjected to synchronization processing, volume adjustment, etc., and is then supplied to an audio output unit 125. The audio output unit 125 performs stereoscopic separation processing corresponding to a speaker system, and supplies its output to a loud speaker 126.

The packets separated by the TS processing unit 122 and including video data are input to a video decoder 131, where decoding corresponding to the encoding scheme is performed. The video data decoded by the video decoder 131 is sent to a video data processing nit 132, where it is subjected to synchronization processing, luminance adjustment, color adjustment, etc., and is then supplied to a video output unit 133. The video output unit 133 can multiplex the data, figures, programs, etc., supplied from the control unit 200 into a main video signal. The video output unit 133 sets, for the output video signal, a scale, resolution, line number, aspect ratio, etc. in accordance with a display unit 134, and outputs the resultant signal to the display unit 134.

There is a case where audio and video packets of a pay program are encrypted. For this case, there is also provided a processing system for decrypting the encrypted data using key information. However, description of this system will be omitted.

The control unit 200 comprises a central processing unit (CPU) 201, an operation command processing unit 202, a communication control unit 203, an operation device managing unit 204, a display processing unit 211 and a memory 212. It further comprises an electronic program guide (EPG) data processing unit, a record control unit, etc., where are not shown.

The CPU 201 performs adjustment of the entire operation sequence of the control unit 200. The operation command processing unit 202 can analyze an operation command externally supplied, and cause the television receiver 100 to reflect an operation corresponding to the command. The operation device managing unit 204 can manage device identification information concerning mobile terminals 500 and 501 and a remote controller 115, which supply operation signals to the control unit 200.

The display processing unit 211 can entirely control video signals displayed on the display unit 134 via the video output unit 133. The display processing unit 211 can also perform adjustment of the resolution, display size and display area of an image signal. The display processing unit 211 further can supply the video output unit 133 with a menu video signal generated in the control unit 200 in accordance with a video signal associated with a program table based on EPG data, and an operation signal. The memory 12 can store various types of data and applications held in the control unit 200.

The communication control unit 203 can access an external device to acquire an operation command, data and content. The acquired content and data can be stored in the storing unit 111 or the memory 212. The communication control unit 203 can transmit data, content, etc., from the television receiver 100 to an external device.

The communication control unit 203 is connected to a wireless communication receiving/transmitting unit 113 and a wired receiving/transmitting unit 112. The wired receiving/transmitting unit 112 can transmit and receive data to and from a remote server or a home server via the Internet. The wireless communication receiving/transmitting unit 113 can perform short-distance communication with a plurality of mobile terminals 500 and 501. The television receiver 100 can also receive operation signals from the remote controller 115 via an infrared receiving unit 114.

The mobile terminals 500 and 501 can remote-control the television receiver 100.

The mobile terminals 500 and 501 can access a server via a base station (not shown), the Internet, etc. They can download various applications, game software, etc., as well as the content supplied by the server, and can transfer them to the control unit 200 via the wireless communication transmitting/receiving unit 113. Further, the mobile terminals 500 and 501 can transfer information (such as a web server address, a mail address, and a network address) for acquiring content, to the control unit 200 via the wireless communication receiving/transmitting unit 113.

The above-mentioned web server address and mail address, and information concerning a motion picture, a still image, a photograph, etc., may be referred to as "recommendation information" or "interest information."

If content, an application or game software is transferred from the mobile terminal 500 or 501, the communication control unit 203 of the control unit 200 operates.

The communication control unit 203 stores received content in the memory 212. The content may be stored in the storing unit 111 in accordance with an operation command or automatically. The storing unit 111 can record the received content on, for example, a hard disk. In the hard disk, the content is managed in the form of a content file.

The menu video signal, program table video signal, etc., for display are stored and/or managed by the display processing unit 211. If a menu or a program table is displayed, menu display data or program table video data is read from a data storing unit (memory or hard disk) under the control of the CPU 201, and is supplied to the display processing unit 211, whereby a menu image or program table image is displayed on the display unit 134.

The menu video signal for display, the program table video signal, etc., can be transmitted to the mobile terminal 500 or 501. If the mobile terminal 500 or 501 requests the menu video signal or the program table video signal, the display processing unit 211 can transmit the same to the mobile terminal.

The mobile terminal 500 or 501 can display the menu video signal and the program table video signal on a touch panel, and the user can instruct the television receiver to perform a designated operation by touching an operation button on the touch (or pointing) panel.

FIG. 8 shows a configuration example of the mobile terminal 500. A display unit 511 serves as a video display unit, and can operate as a touch screen. If a menu image is displayed, if the user touches a desired item on the image, this operation is recognized by an operation command processing unit 524 incorporated in a control unit 520. For instance, if the touch operation indicates selection of a phone function, an operation mode setting unit 526 sets the mobile terminal 500 in a phone mode.

At this time, the display unit 511 displays an operation display for allowing dial input. If an input to dial a desired destination is performed, a phone functioning unit 525 transmits a call signal to the destination via a data processing unit 512, a communication control unit 513A, a transmitting/receiving unit 514A and an antenna 515A. After connected to the destination, a signal therefrom is decoded via the transmitting/receiving unit 514A, the communication control unit 513A and the data processing unit 512, whereby a sound signal is output through a loud speaker 516. The sound signal sent from the originator terminal 500 is sent to the data processing unit 512 via a microphone 517 and processed by the same, and is then sent to the communication control unit 513A. After that, the resultant signal is sent to a communication destination via the transmitting/receiving unit 514A.

A memory 521 is used to temporarily store data or applications. Reference number 523 denotes a rechargeable battery.

The mobile terminal 500 can download content or applications via the Internet, and can transfer the downloaded content or applications to, for example, the television receiver shown in FIG. 1 under the control of a data transfer unit 327. In this case, the mobile terminal 500 functions as an access point. Short-distance communication is realized via a communication control unit 513B, a transmitting/receiving unit 514B and an antenna 515B. The communication control units 513A and 513B, the transmitting/receiving units 514A and 514B, and the antennas 515A and 515B may be formed integral as one body. Further, long-distance communication and short-distance communication may be switched in accordance with the transmitting/receiving mode. Moreover, the mobile terminal 500 may include a camera 518 and an image processing unit 528.

The mobile terminal 500 can download content from an external server or a television receiver, and display it on the display unit 511.

Figure 9:
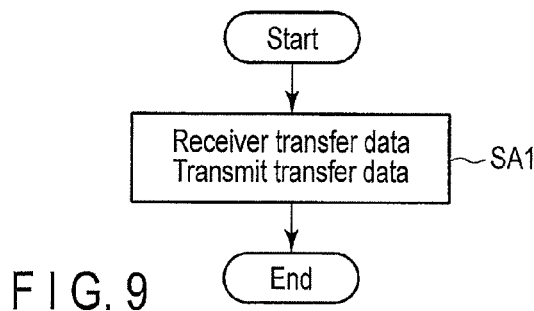
FIG. 9 shows a flowchart illustrating an operation example of the access point shown in FIG. 1.

FIG. 9 shows the relay operation of the access point 300. As shown, the access point 300 receives radio wave or an input high-frequency signal, converts it into a transmission signal, and outputs it as an output high-frequency signal. Any short-distance wireless communication scheme may be employed for the access point 300. The thus-constructed access point 300 enables the mobile terminal and the television receiver to communicate with each other. Further, the access point 300 may have the above-described URL conversion function.

Figure 10:
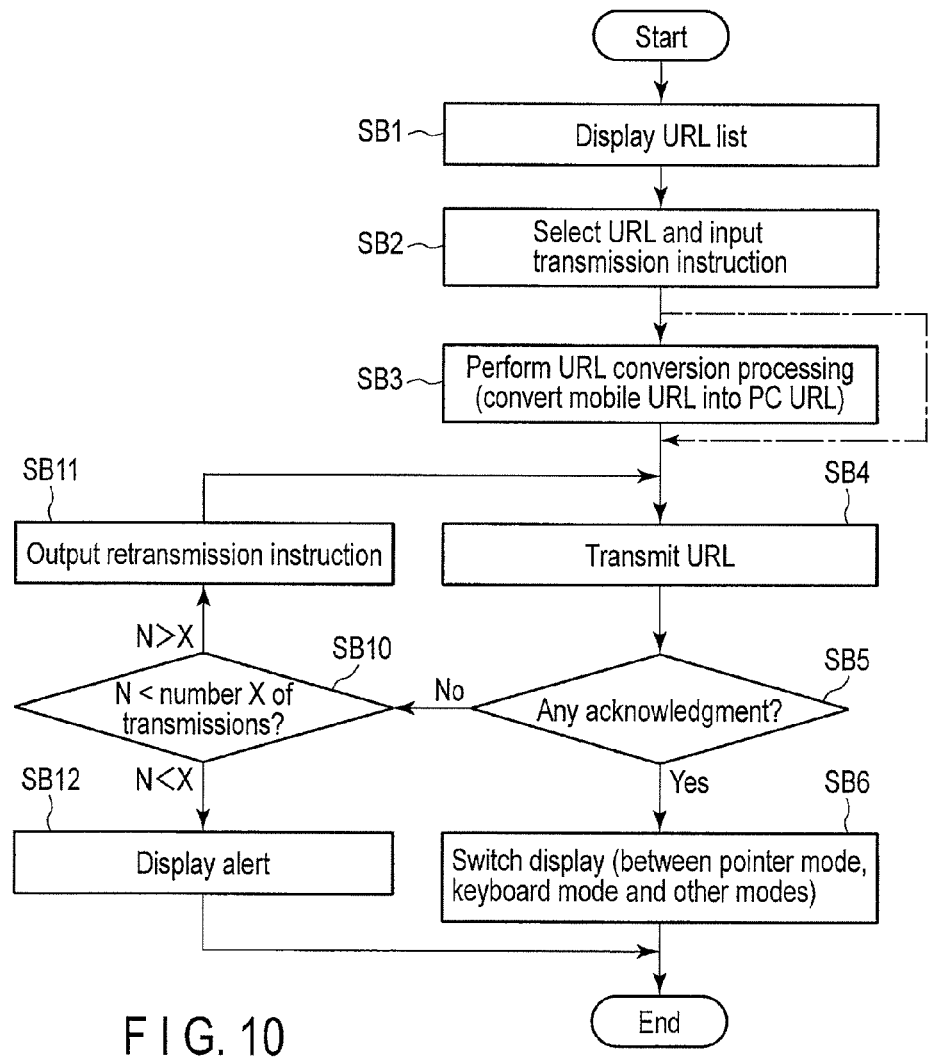
FIG. 10 shows a flowchart illustrating an operation example of the mobile terminal shown in FIG. 1.

FIG. 10 is a flowchart illustrating the operation of the mobile terminal 500 performed to transmit a URL to the television receiver 100. As shown in FIGS. 3A to 3F, if the URL transmission button 551 is operated, a URL list showing, for example, site names is displayed (step SB1). Subsequently, a user selects the name of a desired site and inputs a Send instruction, whereby conversion of a URL for accessing the site is performed (steps SB2 and SB3). If this conversion is performed at the television receiver, step SB3 is not necessary. At the next step SB4, transmission processing of the URL is performed.

If an acknowledgment indicating reception of the URL is received from the television receiver (step SB5), the display of the mobile terminal 500 may be automatically switched, or maintained as it is, or switched in accordance with a user operation. The display after switching may be a display of the pointer mode, keyboard mode or browser operation element display mode, as was described referring to FIGS. 3A to 3F and 4.

If no acknowledgement is received from the television receiver at step SB5, the mobile terminal 500 confirms whether the same URL is sent x times (step SB10). If the same URL is not sent x times, a retransmission instruction is output (step SB11). In contrast, if the same URL is already sent x times, an alert is displayed (step SB12).

FIG. 11 is a flowchart useful in explaining the operation of the television receiver 100 performed if receiving an URL from the mobile terminal 500. Upon receiving data, the television receiver 100 analyzes the data and determines whether it includes a URL (steps SC, SC2, SC3). If the received data includes the URL, the television receiver 100 transmits an acknowledgment to the mobile terminal 500 (step SC4). If the data includes no URL, the television receiver 100 performs another process corresponding to the content of the received data (step SC5).

After transmitting the acknowledgment to the mobile terminal 500, the television receiver 100 activates the application corresponding to the site to access. This application is a program code for rendering the content acquired by accessing a network to output the content to a display unit. For instance, an application adapted to a browser or You Tube is activated. Subsequently, based on the received URL, the television receiver 100 accesses a server to download and display data (content) (steps SC7, SC8 and SC9).

If the received URL is a PC URL, the television receiver 100 uses the same as an address for acquiring content of high image quality. In contrast, if the received URL is a mobile URL, the television receiver 100 converts the same into a PC URL to use it as an address for acquiring content of high image quality.

FIG. 12 shows an example of an operation of the television receiver 100 performed for activation upon receiving a URL from the mobile terminal 500.

As a power-off state, the television receiver 100 can assume a standard power-off state and a standby state.

However, even in the standard power-off state, the wireless communication receiving/transmitting unit 113, the wired receiving/transmitting unit 112, the communication control unit 203, the command processing unit 202 and the memory 212 are in the active state and therefore can receive data from outside.

In the standby-state (also referred to as a power-saving state), for example, the audio decoder 123, the audio data processing unit 124, the audio output unit 125, the video decoder 131, the video data processing unit 132, the video output unit 133, and the display unit 134 are in the off state, and the other elements are in the active state.

The mobile terminal 500 comprises a transmitter for transmitting, as a power-on signal to the television receiver 100, a URL on a network, which is used depending upon whether the television receiver 100 is in the standby state or the power-off state. If the television receiver 100 is in the standby state, the transmitter uses the URL as a trigger for turning on the television receiver 100. On the other hand, if the television receiver 100 is in the power-off state, the transmitter transmits a magic packet to the television receiver 100 to activate the same, and then transmits the URL to the television receiver 100.

The television receiver 100 comprises a power-on unit for activating the television receiver upon receiving the URL on the network used by the mobile terminal 500, and an activation unit for automatically activating an application used to display content acquired using a URL. In the standby state, upon receiving a URL, the television receiver 100 uses the URL as a trigger for shifting to the power-on state. Thus, in the power-off state, the television receiver 100 receives a magic packet from the mobile terminal 500 to start up, and automatically activates, after the start-up, an application for displaying content acquired using a URL.

Namely, upon receiving a URL in the standby state, the command processing unit 202 of the television receiver 100 can interpret the URL not just as data, but as a power-on instruction for turning on the entire television receiver. As a result, the entire television receiver 100 starts up and shifts to a You Tube image display state or a browsing state. In this state, the television receiver 100 can transmit an acknowledgment to the mobile terminal 500.

Also if the television receiver 100 is in the standard power-off state, the command processing unit 202 can interpret the URL as a power-on instruction for turning on the entire television receiver.

However, some television receivers need special data, such as a magic packet, sent by remote control in order to shift from the standard power-off state to the power-on state. In these television receivers, the command processing unit 202 may not activate the power supply even after receiving a URL. In this case, the mobile terminal 500 will receive no acknowledgment within a preset period after transmitting the URL. At this time, the mobile terminal 500 transmits, to the television receiver 100, a URL with a magic packet attached to the leading portion thereof, with the result that the television receiver 100 shifts to the power-on state, thereby shifting to a You Tube image display state or a browsing state.

As described above, in the embodiment, the television receiver that accesses a server on a network to acquire and display moving picture content, and the mobile terminal 500 can be operated in association with each other.

Thus, the mobile terminal 500 can transmit, to the television receiver 100, a URL for accessing a moving picture site on a web. In this case, a digital television receiver that automatically convert a mobile URL corresponding to low image quality (low definition) into a URL corresponding to high quality image (high definition) can replay a moving picture of high quality. Namely, the system of the embodiment comprises a converter for converting a first address on a network used by the mobile terminal 500 on a path for transmitting the address to the television receiver 100. More specifically, the first address is converted into information including a second address that is suitable for the performance of the television receiver, is usable in the television receiver, and serves as a trigger for activating a particular application.

By virtue of this structure, the television receiver can reproduce a moving picture suitable for the resolution thereof.

In the embodiment, if the URL sent from the mobile terminal to the television receiver is addressed to a moving picture site, the display of the mobile terminal is switched to a replay operation display for operating the television receiver. In contrast, if the URL is addressed to a website, the display of the mobile terminal is switched to a pointer operation display for operating the television receiver. Namely, the display of the mobile terminal can be switched to that optimal to operate a site image received by the television receiver, i.e., the television operation display corresponding to the content of a URL. This enables the user to omit a display selection/switching operation.

Further, in the embodiment, if the mobile terminal transmits a URL to the television receiver, this serves as a trigger to automatically turn on the television receiver if its power supply is in an active standby state, thereby permitting a webpage corresponding to the received URL to be displayed on the television receiver. Namely, the television receiver can acquire and display the content of a target website even if the user does not perform a power-on operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system in which a mobile terminal and a television receiver are configured to be interactively communicable with each other, comprising:
   a transmitter configured to transmit a first Uniform Resource Locator (URL) to the television receiver, wherein the first URL being a mobile URL and being adapted for conversion to a second URL, where the first URL or the second URL operate as a command to power-on the television receiver, and the television receiver is configured to use the second URL to start an application for displaying contents obtained from a server; and
   a processor configured to (i) automatically switch, after transmission of the first URL, a display of the mobile terminal to a replay operation display or a pointer operation display for operating the television receiver, wherein the replay operation display is displayed if the first URL is addressed to a moving picture site, the pointer operation display is displayed if the first URL is addressed to a website, and (ii) transmit a communication to the television receiver including the first URL and a packet for instructing the television receiver to power-on when the processor receives no acknowledgment within a preset period of time after transmitting the first URL.

2. The communication system according to claim 1, wherein if an acknowledgment from the television receiver is received after the first URL is transmitted to the television receiver, the processor switches the display thereof to the replay operation display or the pointer operation display.

3. The communication system according to claim 1, wherein if the television receiver shifts from a power-on state to a standby state or a power-off state, the mobile terminal returns the display to a display thereof assumed before the replay operation display or the pointer operation display.

4. The communication system according to claim 1, wherein after the first URL is transmitted, the mobile terminal switches the display thereof from an operation display for address transmission to the replay operation display or the pointer operation display.

5. A mobile terminal configured to be interactively communicable with a television receiver and a server on a network, comprising:
   a transmitter configured to transmit a first Uniform Resource Locator (URL) to the television receiver, wherein the first URL being a mobile URL and being adapted for conversion to a second URL, where the first URL or the second URL operate as a command to power-on the television receiver, and the television receiver is configured to use the second URL to start an application for displaying contents obtained from a server; and
   a processor configured to (i) automatically switch, after transmission of the first URL, a display of the mobile terminal to a replay operation display or a pointer operation display for operating the television receiver, wherein the replay operation display is displayed if the first URL is addressed to a moving picture site, the pointer operation display is displayed if the first URL is addressed to a website, and (ii) transmit a communication to the television receiver including the first URL and a packet for instructing the television receiver to power-on when the processor receives no acknowledgment within a preset period of time after transmitting the first URL.

6. The mobile terminal according to claim 5, wherein if an acknowledgment from the television receiver is received after the first URL is transmitted to the television receiver, the processor switches the display thereof to the replay operation display or the pointer operation display.

7. The mobile terminal according to claim 5, wherein if the television receiver shifts from a power-on state to a standby state or a power-off state, the mobile terminal returns the operation display to a display thereof assumed before the operation display.

8. The mobile terminal according to claim 5, wherein after the first URL is transmitted, the processor switches the display thereof from an operation display for address transmission to the replay operation display or the pointer operation display.

9. A communication method of a mobile terminal which is configured to be interactively communicable with a television receiver and a server on a network, comprising:
   transmitting a first Uniform Resource Locator (URL) to the television receiver, wherein the first URL being a mobile URL and being adapted for conversion to a second URL, where the first URL or the second URL operate as a command to power-on the television receiver, and the television receiver is configured to use the second URL to start an application for displaying contents obtained from a server; and
   automatically switch, after transmission of the first URL, a display of the mobile terminal to a replay operation display or a pointer operation display for operating the television receiver, wherein the replay operation display is displayed if the first URL is addressed to a moving picture site, the pointer operation display is displayed if the first URL is addressed to a website; and
   transmitting a communication to the television receiver including the first URL and a packet for instructing the television receiver to power-on when the processor receives no acknowledgment within a preset period of time after transmitting the first URL.

10. The communication method of the mobile terminal of claim 9, wherein an acknowledgment from the television receiver is received after the first URL is transmitted to the television receiver, the processor switches the display thereof to the replay operation display or the pointer operation display is executed.

11. The communication method of the mobile terminal of claim 9, wherein if the television receiver shifts from a power-on state to a standby state or a power-off state, the mobile terminal returns the display to a display thereof assumed before the replay operation display or the pointer operation display.

12. A communication system in which a mobile terminal and a television receiver are configured to be interactively communicable with each other, comprising:
   a transmitter configured to transmit a first Uniform Resource Locator (URL) to the television receiver, the first URL being a mobile URL to operate as a command to power-on the television receiver; and
   a processor configured to (i) determine whether an acknowledgement has been received from the television receiver within a preset period of time and (ii) transmit a communication including the first URL and a packet for instructing the television receiver to power-on when no acknowledgment has been received.

13. The communication system of claim 12, wherein the processor is further configured to automatically switch, after transmission of the first URL, a display of the mobile terminal to a replay operation display or a pointer operation display for operating the television receiver, wherein the replay operation display is displayed when the first URL is addressed to a website of a moving picture, the pointer operation display is displayed when the first URL is addressed to a website not of a moving picture.

14. The communication system of claim 12, wherein the second first URL is converted to a second URL, the second URL (i) being a non-mobile URL, (ii) adapted to act as a command to power-on the television receiver, and (iii) adapted to start an application for displaying contents obtained from a server.

* * * * *